(12) United States Patent
Tanner et al.

(10) Patent No.: US 11,843,285 B2
(45) Date of Patent: Dec. 12, 2023

(54) SYSTEMS AND METHODS FOR CONSTRUCTING EFFICIENT PERMANENT MAGNET MOTORS

(71) Applicant: Baker Hughes Oilfield Operations, LLC, Houston, TX (US)

(72) Inventors: David M. Tanner, Broken Arrow, OK (US); Mark Bellmyer, Broken Arrow, OK (US); Ameen Muhammed, Broken Arrow, OK (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 13 days.

(21) Appl. No.: 17/246,916

(22) Filed: May 3, 2021

(65) Prior Publication Data

US 2021/0351645 A1 Nov. 11, 2021

Related U.S. Application Data (60) Provisional application No. 63/022,182, filed on May 8, 2020.

(51) Int. Cl.
*H02K 1/30* (2006.01)
*H02K 1/278* (2022.01)
(Continued)

(52) U.S. Cl.
CPC ........... *H02K 1/278* (2013.01); *E21B 43/128* (2013.01); *F04D 13/10* (2013.01); *F04D 29/043* (2013.01);
(Continued)

(58) Field of Classification Search
CPC ........ H02K 1/276; H02K 1/2793; H02K 1/30; H02K 7/003; H02K 2213/09; F21B 43/128; F04D 29/043; F04D 13/10
(Continued)

(56) References Cited

U.S. PATENT DOCUMENTS 6,388,353 B1 5/2002 Liu
6,867,524 B2 3/2005 Liang
(Continued)

FOREIGN PATENT DOCUMENTS

CN 205429910 U 8/2016
CN 106329777 A 1/2017
(Continued)

OTHER PUBLICATIONS

Jiabin et al., Research of six-pole permanent magnet submersible motor design, Proceedings of 2011 6th International Forum on Strategic Technology, Harbin, Aug. 22-24, 2011, pp. 545-548.
(Continued)

*Primary Examiner* — Terrance L Kenerly
(74) *Attorney, Agent, or Firm* — Sprinkle IP Law Group (57) ABSTRACT

Systems and methods for constructing a motor having a stator, and a plurality of rotor sections secured to a shaft which is positioned to rotate within a bore of the stator. Each rotor section has permanent magnets forming corresponding magnetic poles. Each rotor section has first and second inwardly facing keyways which are identically positioned in each rotor section and are configured to enable each rotor section to be alternately positioned in at least three distinct circumferential orientations with respect to a key of the shaft. A first subset of the rotor sections is secured to the shaft in a first one of the circumferential orientations, a second subset of the rotor sections is secured to the shaft in a second one of the circumferential orientations, and a third subset of the rotor sections is secured to the shaft in a third one of the circumferential orientations.

18 Claims, 8 Drawing Sheets

(51) Int. Cl.
  *H02K 1/276* (2022.01)
  *F04D 13/10* (2006.01)
  *F04D 29/043* (2006.01)
  *E21B 43/12* (2006.01)
  *H02K 7/00* (2006.01)
  *H02K 1/2798* (2022.01)

(52) U.S. Cl.
  CPC ........... *H02K 1/276* (2013.01); *H02K 1/2798* (2022.01); *H02K 1/30* (2013.01); *H02K 7/003* (2013.01); *H02K 2213/09* (2013.01)

(58) Field of Classification Search
  USPC ..................................................... 310/156.53
  See application file for complete search history.

(56) References Cited

U.S. PATENT DOCUMENTS

| | | |
|---|---|---|
| 7,098,569 B2 | 8/2006 | Ong |
| 8,324,781 B2 | 12/2012 | Goto |
| 9,322,399 B2 | 4/2016 | Sagalovskiiy |
| 9,641,033 B2 | 5/2017 | Papini |
| 9,893,578 B2 | 2/2018 | Clingman |
| 2011/0291498 A1 | 12/2011 | Sakata |
| 2013/0342043 A1* | 12/2013 | Liang ................. H02K 1/27 310/51 |
| 2015/0069879 A1* | 3/2015 | Papini ................. H02K 1/30 29/598 |
| 2015/0288234 A1 | 10/2015 | Salesman |
| 2016/0315527 A1 | 10/2016 | Clingman |
| 2017/0264161 A1 | 9/2017 | Forsberg |

FOREIGN PATENT DOCUMENTS

| | | | |
|---|---|---|---|
| CN | 110071615 A | 7/2019 | |
| KR | 10-1262902 | 5/2013 | |
| KR | 10-2020-0036616 | 4/2020 | |
| WO | WO2017160388 | * 9/2017 | ............... H02K 1/28 |

OTHER PUBLICATIONS

Cao et al., Modeling of the Electromagnetic Drive Torque on the Permanent Magnet in a Novel Drive Mechanism, Applied Engineering, Materials and Mechanics, vol. 872, pp. 310-315.

International Search Report and the Written Opinion for International Patent Application No. PCT/US2021/030289, dated Aug. 25, 2021, 9 pgs.

* cited by examiner

SYSTEMS AND METHODS FOR CONSTRUCTING EFFICIENT PERMANENT MAGNET MOTORS

BACKGROUND

Field of the Invention

The invention relates generally to electric motors, and more particularly to systems and methods for construction of elongated electric motors in which the motor shaft can twist and skew the alignment of multiple rotor sections that are coupled to the shaft.

Related Art

Oil and natural gas are often produced by drilling wells into oil reservoirs and then pumping the oil and gas out of the reservoirs through the wells. If there is insufficient pressure in the well to force these fluids out of the well, it may be necessary to use an artificial lift system in order to extract the fluids from the reservoirs. A typical artificial lift system employs an electric submersible pump (ESP) which is positioned in a producing zone of the well to pump the fluids out of the well.

An ESP system includes a pump and a motor which is coupled to the pump and drives the pump to lift fluid out of the well. The ESP system may also include seals, gauge packages and other components. Because they are designed to fit within the borehole of a well, ESP systems are typically very narrow (e.g., less than ten inches wide), but very long (e.g., tens of feet). The motor of an ESP system may produce hundreds of horsepower.

One type of motor that may be used in ESP systems is a permanent-magnet motor. In this type of motor, a long motor shaft extends through several rotor sections that are coupled to the shaft. Each of the rotor sections includes a set of permanent magnets that are typically positioned in multiple (e.g., four) axially aligned rows. The shaft and rotor sections are positioned within a stator which has several coils or windings of wire positioned in a stator core. When the coils are energized, the windings generate magnetic fields that interact with the magnets of the rotor sections. The power provided to the stator windings is controlled to cause the magnetic fields of the stator to drive the rotor sections to rotate within the stator, thereby driving the rotation of the shaft. The rotating shaft is coupled to the ESP system's pump and drives the pump to lift fluid out of the well.

There are several problems that may arise in the operation of permanent-magnet motors. For example, the motor may experience inefficiencies relating to the twisting of the motor shaft when the motor is operated. When the stator is energized, each rotor section in the motor develops torque which is applied to the shaft. Because the shaft is long and not completely rigid, this causes the shaft to twist. If the magnets of the rotor sections are aligned when the motor is at rest, the magnets will become misaligned as the shaft twists. As a result, some of the magnets will not be synchronized with the rotating magnetic fields of the stator and some of the rotor sections will impart less torque on the shaft than others. The torque output, power output, and efficiency will therefore be reduced.

Systems have been developed to enable individual rotor sections to be "clocked" or rotated with respect to each other so that when the motor is at rest, the magnets of the rotor sections are misaligned, but as the motor is operated and the shaft twists, the magnets of the different rotor sections come into alignment. While these systems may be effective in improving the efficiency of the respective motors, mechanisms used to clock the individual rotor sections may be relatively complex and difficult to manufacture. They may also require assembly by more skilled technicians. As a result, it may be impractical to implement systems using these existing mechanisms.

It would therefore be desirable to provide means to mitigate this problem.

SUMMARY OF THE INVENTION

This disclosure is directed to systems and methods for constructing electric motors that may mitigate or resolve the problems discussed above. Embodiments disclosed herein provide simple but effective means to manufacture permanent magnet motors in which individual rotor sections are identically configured with static keys that enable them to be clocked at predetermined angles with respect to each other. Each rotor section is manufactured with two fixed keyways that are used to prevent rotation of the rotor section with respect to the motor shaft. The keyways are offset in a manner that allows the magnets of the rotor section to be oriented in either three or four different rotational/circumferential positions, depending upon the keyway that is used and the direction in which the rotor section is facing.

One embodiment comprises a motor having a stator, a plurality of rotor sections and a shaft. Each of the rotor sections is secured to the shaft, and this assembly is positioned coaxially within the bore of the stator so that it can rotate. Each rotor section has one or more permanent magnets and corresponding magnetic poles. Each rotor section has first and second inwardly facing keyways which are identically positioned in each rotor section. The first and second keyways are configured to enable each rotor section to be positioned in one of at least three distinct circumferential orientations with respect to a key of the shaft. A first subset of the rotor sections is secured to the shaft in a first one of the circumferential orientations, a second subset of the rotor sections is secured to the shaft in a second one of the circumferential orientations, and a third subset of the rotor sections is secured to the shaft in a third one of the circumferential orientations.

Each of the first, second and third subsets of rotor sections may include a different number of the rotor sections. In one embodiment, each of the plurality of rotor sections is identical. In one embodiment, the first keyway in each of the rotor sections is aligned with a magnetic pole of the rotor section and the second keyway is angularly offset from the pole, so that the rotor section is capable of being positioned in one of three distinct circumferential orientations with respect to the key of the shaft. In another embodiment, both the first and second keyways in each of the rotor sections are angularly offset from the magnetic pole, so that the rotor section is capable of being positioned in one of four distinct circumferential orientations with respect to the key of the shaft.

An alternative embodiment comprises an ESP system having a submersible pump and a motor coupled to drive the pump. The motor includes a stator having a bore therethrough, a plurality of rotor sections rotatably positioned coaxially within the bore of the stator, where each of the rotor sections is secured to a motor shaft. Each of the plurality of rotor sections includes one or more permanent magnets and has corresponding magnetic poles. Each rotor section also has first and second inwardly facing keyways, wherein the first and second keyways are identically positioned in each rotor section, and are configured to enable each rotor section to be positioned in one of at least three distinct circumferential orientations with respect to a key of the shaft. A first subset of the rotor sections is secured to the shaft in a first one of the circumferential orientations, a second subset of the rotor sections is secured to the shaft in a second one of the circumferential orientations, and a third subset of the rotor sections is secured to the shaft in a third one of the circumferential orientations.

Another alternative embodiment comprises a method. The method includes providing a motor shaft having one or more axially aligned keys, and providing a plurality of rotor sections, where each of the rotor sections includes one or more permanent magnets and has corresponding magnetic poles. Each rotor section has first and second inwardly facing keyways which are identically positioned in each rotor section and enable each rotor section to be positioned in one of at least three distinct circumferential orientations with respect to the keys of the shaft. The method further includes installing a first subset of the plurality of rotor sections in a first one of the circumferential orientations, installing a second subset of the plurality of rotor sections in a second one of the circumferential orientations, and installing a third subset of the plurality of rotor sections in a third one of the circumferential orientations.

Numerous other embodiments may also be possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for constructing downhole electric motors in which multiple rotor sections are oriented rotationally or circumferentially with respect to each other to counter misalignment of the rotor sections and the resulting unequal torque contributions by the different rotor sections during operation of the motor. (Adjusting the rotational or circumferential orientation of the rotor sections may also be referred to as "clocking" the rotor sections, or adjusting the timing of the rotor sections.) The rotor sections are identically manufactured with two static keyways that enable installation of each rotor section in one of three (or in some embodiments four) different rotational positions. This allows each rotor section to be installed with a predetermined advanced, neutral or delayed rotational orientation with respect to a key of the motor shaft.

Figure 1:
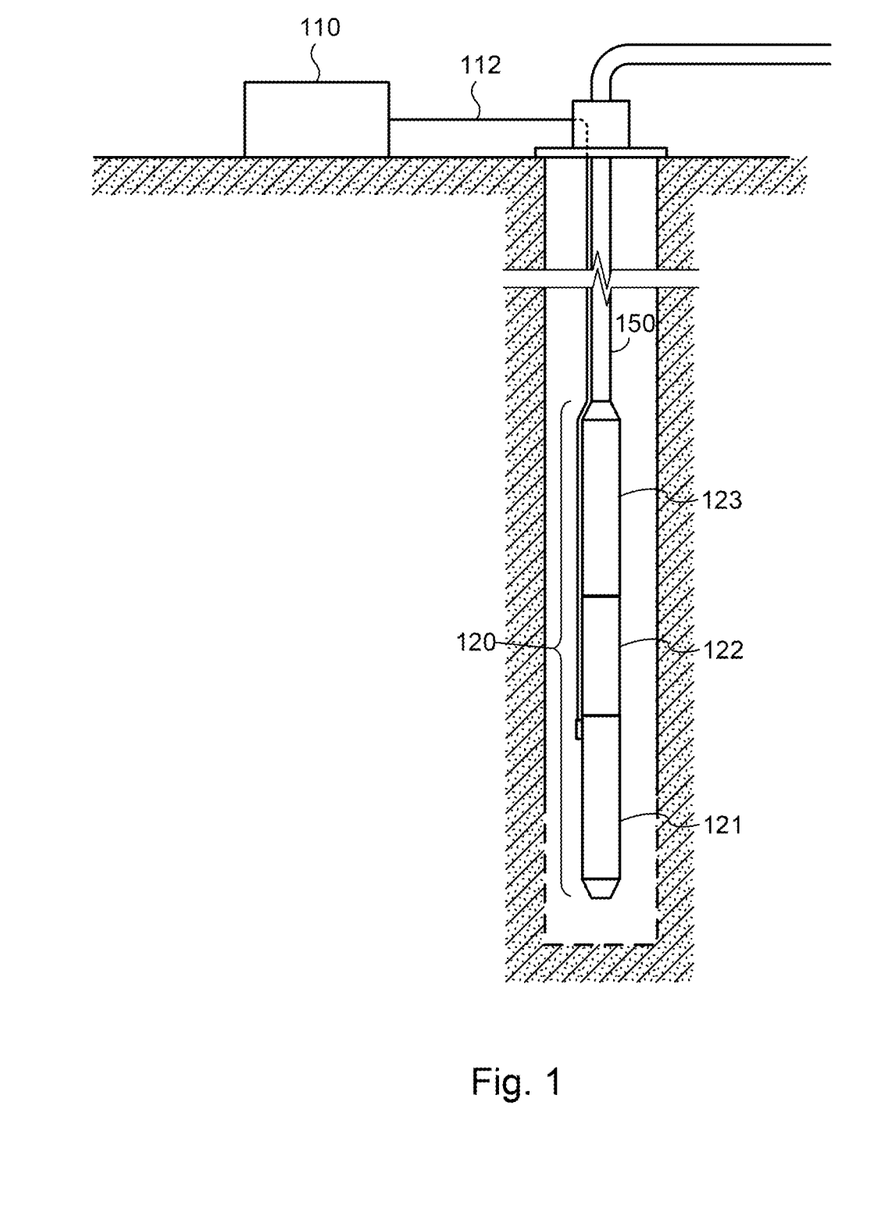
FIG. 1 is a diagram illustrating some of the primary components of an ESP system.

Before describing the keying of the rotor sections, it may be helpful to review the overall structure of the ESP system. Referring to FIG. 1, a diagram illustrating an exemplary ESP system is shown. In this figure, an ESP system is installed in a well. An ESP 120 is coupled to the end of tubing string 150, and the ESP and tubing string are lowered into the wellbore to position the ESP in a producing portion of the well (as indicated by the dashed lines at the bottom of the wellbore). Surface equipment which includes a drive system 110 is positioned at the surface of the well. Drive system 110 is coupled to ESP 120 by power cable 112, which runs down the wellbore along tubing string 150. Tubing string 150 and power cable 112 may range from less than one thousand feet in a shallow well, to many thousands of feet in a deeper well.

In this embodiment, ESP 120 includes a motor section 121, seal section 122, and pump section 123. ESP 120 may include various other components which will not be described in detail here because they are well known in the art and are not important to a discussion of the invention. Motor section 121 is operated to drive pump section 123, thereby pumping the oil or other fluid through the tubing string and out of the well. Drive system 110 produces power (e.g., three-phase AC power) that is suitable to drive motor section 121. This output power is provided to motor section 121 via power cable 112.

Figure 2:
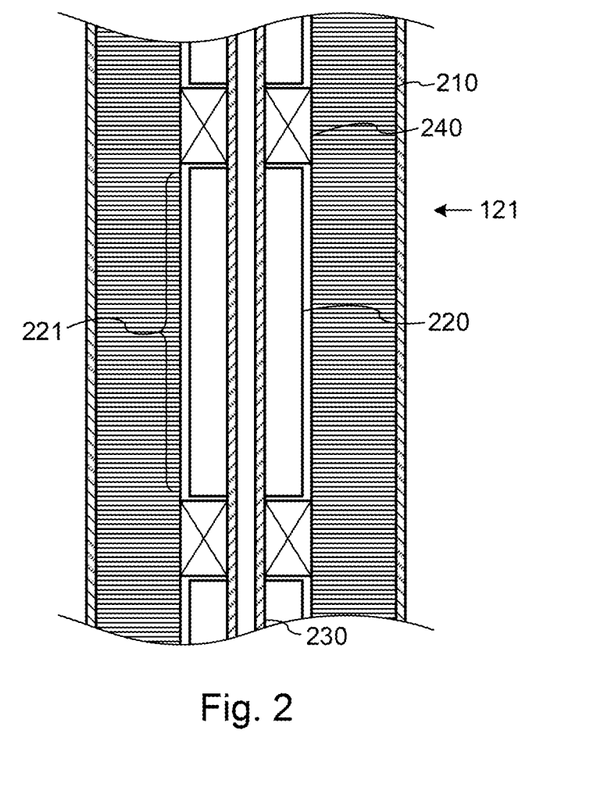
FIG. 2 is a diagram illustrating an exemplary structure of a motor suitable for use in an ESP system as shown in FIG. 1.

Referring to FIG. 2, a diagram illustrating the structure of an exemplary structure of motor 121 is shown. As depicted in this figure, motor 121 has a stator 210 and a rotor 220. Stator 210 is generally cylindrical, with a coaxial bore that runs through it. Rotor 220 is coaxially positioned within the bore of stator 210. Rotor 220 includes multiple rotor sections (e.g., 221), each of which is attached to a shaft 230 that is coaxial with the rotor and stator 210. Bearings (e.g., 240) are positioned at the ends of each rotor section. The bearings support shaft 230, and consequently rotor 220, within the bore of stator 210 and allow the rotor and shaft to rotate within the stator.

Figure 3A:
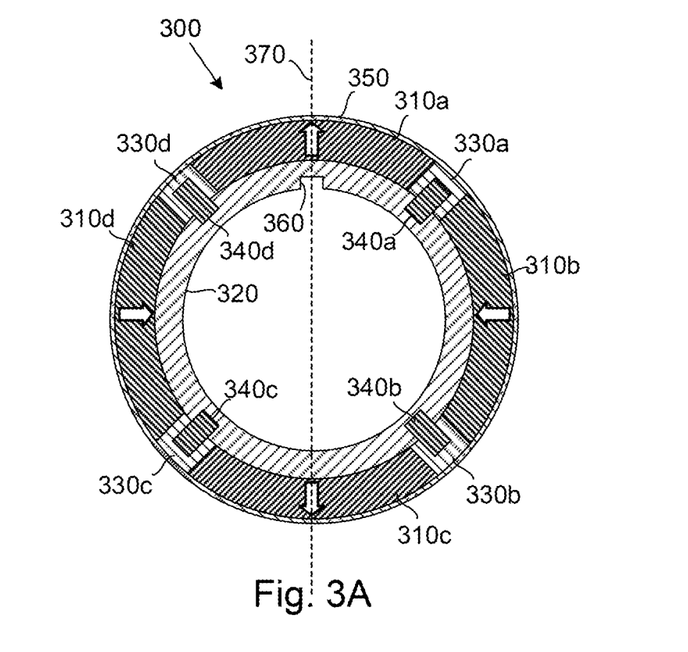
FIGS. 3A and 3B are a pair of diagrams illustrating an exemplary permanent magnet rotor section.
Figure 3B:
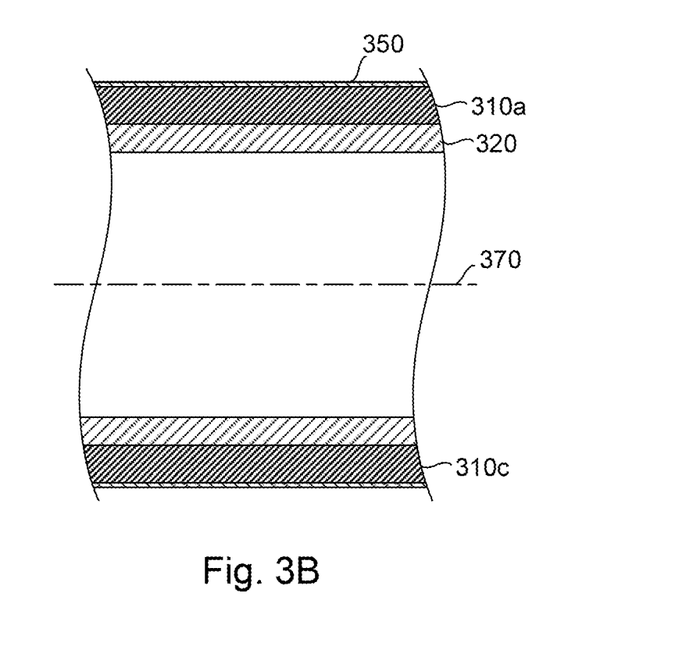

Referring to FIGS. 3A and 3B, a pair of diagrams illustrating an exemplary permanent magnet rotor section are shown. FIG. 3A shows a cross-section of the rotor section normal to the rotor section's axis, while FIG. 3B shows a cross-section of the rotor section which is coplanar with the axis (370). As depicted in these figures, rotor section 300 is a surface-mount rotor section which has four permanent magnets 310a-310d mounted on an outer (radially outward-facing) surface of a carrier 320. Spacers 330a-330d are positioned between the magnets to maintain their spacing around the circumference of the rotor section. Pins 340a-340d maintain the positioning of the spacers with respect to the carrier and prevent the spacers (and consequently the magnets) from moving circumferentially with respect to the carrier. An outer sleeve 350 is positioned radially outward from the magnets and spacers to help hold the magnets in place on the carrier. A keyway 360 is provided on the inner (radially inward-facing) surface of carrier 320. The keyway is used in conjunction with a key on the motor shaft to prevent rotation of the rotor section with respect to the shaft.

"Circumferentially", "circumferential" and similar terms are used herein to refer to the direction around the circumference of the rotor section. "Axial", "axially" and similar terms are used herein to refer to the direction generally parallel to the axis of rotation of the rotor section. "Radially" and similar terms are used herein to refer to directions perpendicular to the axis of rotation of the rotor section.

Figure 4A:
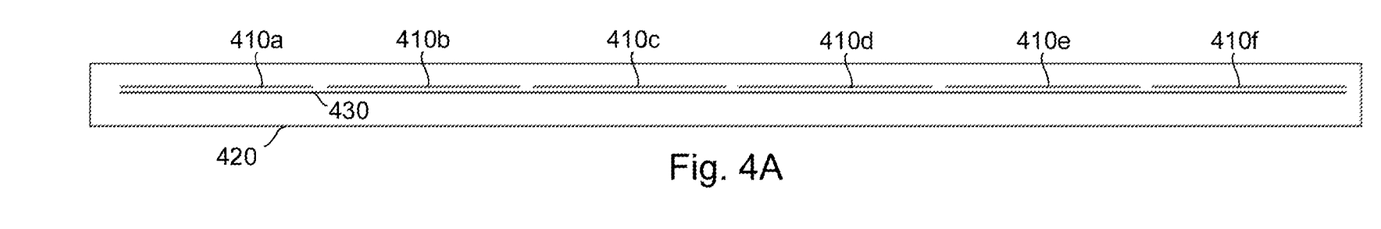
FIGS. 4A and 4B are diagrammatic representations of the positioning of a series of rotor sections mounted on a motor shaft when the motor is at rest and in operation.
Figure 4B:
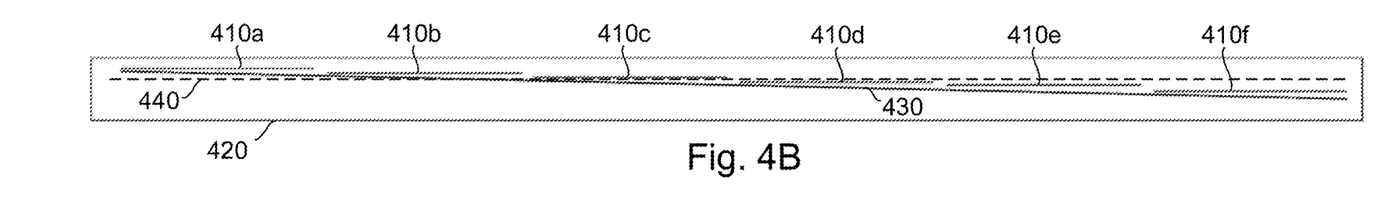

As noted above, a motor for an ESP typically has multiple rotor sections. Conventionally, all of the rotor sections (and the corresponding magnets) are aligned when the rotor sections are mounted on the motor shaft. In other words, all of the rotor sections have the same circumferential alignment. This is illustrated in FIG. 4A. FIG. 4A is a diagrammatic representation of the positioning of a series of rotor sections 410a-410f mounted on a motor shaft 420. Line 430 represents a key which extends along the length of shaft 420. When the motor is not in operation, shaft 420 is not twisted (as indicated by the straight horizontal line 430) and the rotor sections remain aligned. When the motor is operated, however, each of the rotor sections applies a corresponding torque to the motor shaft, which causes the shaft to twist. This is illustrated in FIG. 4B, which is a diagrammatic representation of the rotor sections on the shaft during operation. The twisting of the shaft is represented by the slope of line 430. The twisting of the shaft causes rotor sections 410a-410f to become misaligned (as illustrated by the relative vertical displacement of the corresponding lines in the figure). As a result of this misalignment, the rotor sections are not all synchronized with the rotating magnetic fields of the motor's stator (indicated by dashed line 440). The rotor sections which are misaligned with respect to the rotating magnetic fields of the stator develop a reduced amount of torque (as compared to a rotor section which is aligned with the stator's magnetic fields).

Figure 5:
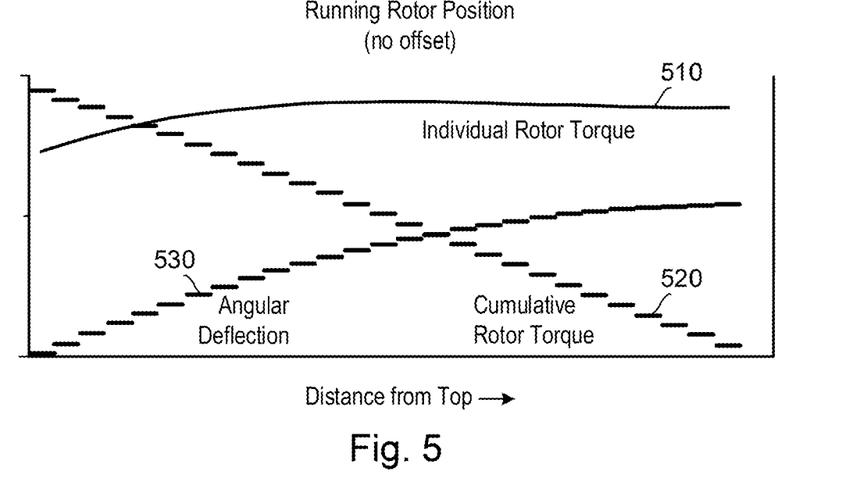
FIG. 5 is a diagrammatic illustration of the performance of a conventional ESP motor during operation.

Referring to FIG. 5, a diagrammatic illustration of the performance of the conventional ESP motor during operation is shown. FIG. 5 is a chart that includes three curves: individual rotor section torque 510, total torque 520 and deflection 530. Each of the curves is shown as a function of the distance from the top of the motor. The curves do not include specific values, as these values are unimportant to the discussion of the invention. It should also be noted that the curves are normalized to a similar vertical scale to facilitate comparison of the features of the curves.

It can be seen from curve 530 of FIG. 5 that operation of the motor causes the motor shaft to twist, thereby causing a deflection of each rotor section from its original position. The rotor section at the top of the shaft (represented at the left end of the curve) has 0 relative deflection. The next rotor section is deflected slightly as represented by its vertical displacement on the curve. ("Deflection", as used herein refers to the circumferential deflection or misalignment of the rotor sections resulting from the twisting of the shaft.) Each rotor section is slightly deflected with respect to the adjacent rotor sections. It can be seen that the deflection is not a linear function of the position along the shaft, and the relative deflection of the adjacent rotor sections decreases as the distance from the top of the shaft increases (to the right in the figure). The greater deflection at the upper end results from the mechanical load of the pump at this end of the shaft.

As mentioned above, the deflection of the shaft and rotor sections results in a reduced torque for rotor sections that are misaligned with respect to the rotating stator fields. The reduction in torque is not a linear function, but is instead a cosine function. Thus, rotor sections which are only slightly misaligned will experience only a small reduction in torque, while more misaligned rotor sections will experience increasingly greater torque reduction. This is illustrated by curve 510. The stator fields will be synchronized with rotor sections that are toward the middle of the motor, with rotor sections on one end of the motor being more advanced (i.e., positively circumferentially deflected) and rotor sections on the other end of the motor being more delayed (i.e., negatively circumferentially deflected).

As depicted in FIG. 5, the rotor sections at the top of the motor are deflected by a greater amount from the synchronized rotor sections than the rotor sections at the bottom of the motor. In other words, the rotor-section-to-rotor-section displacement is greater at the top of the motor than the bottom of the motor. Because of the displacement is greater for the upper rotor sections, they will be more misaligned with respect to the stator fields than the lower rotor sections. Consequently, the magnitude of the torque reduction is greater for the rotor sections at the top of the motor (as indicated by the drop at the left side of curve 510).

It is therefore desirable to construct the motor in a way that achieves alignment of the rotor sections during operation so that torque reduction for the individual rotor sections resulting from misalignment is minimized. As noted above, some existing systems seek to achieve alignment of the rotor sections by rotating or "clocking" rotor sections with respect to each other. In some systems, each rotor section is offset by a specific amount from adjacent rotor sections. This may require that each rotor section have components that are specifically machined to achieve the desired positioning of that rotor section. In other systems, the mechanism for achieving the desired clocking of the rotor section is adjustable, but such mechanisms are often relatively complex, and may therefore require much greater cost to manufacture and skill to assemble. Embodiments of the present invention avoid these problems by manufacturing each rotor section identically, while nevertheless providing means for multiple distinct circumferential orientations of the rotor sections that substantially counter the twisting of the motor shaft during operation.

Figure 6A:
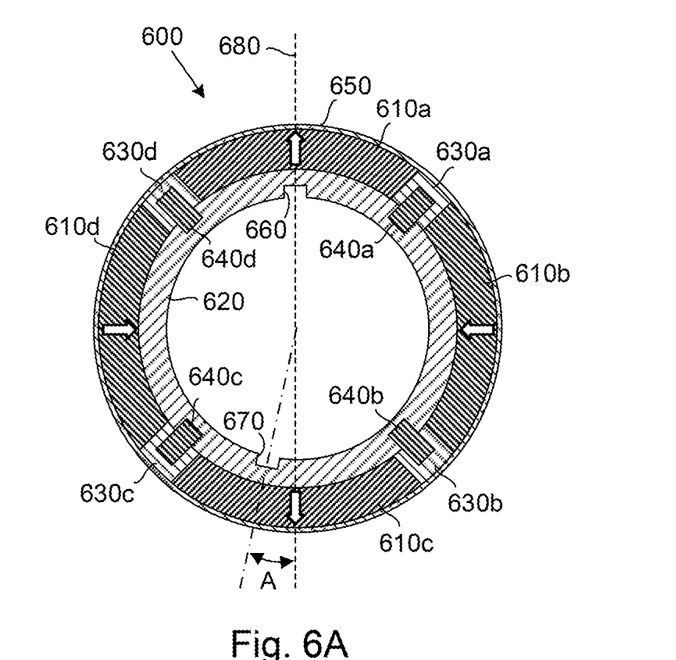
FIGS. 6A and 6B are a pair of diagrams illustrating the structure of rotor sections in accordance with two exemplary embodiments.
Figure 6B:
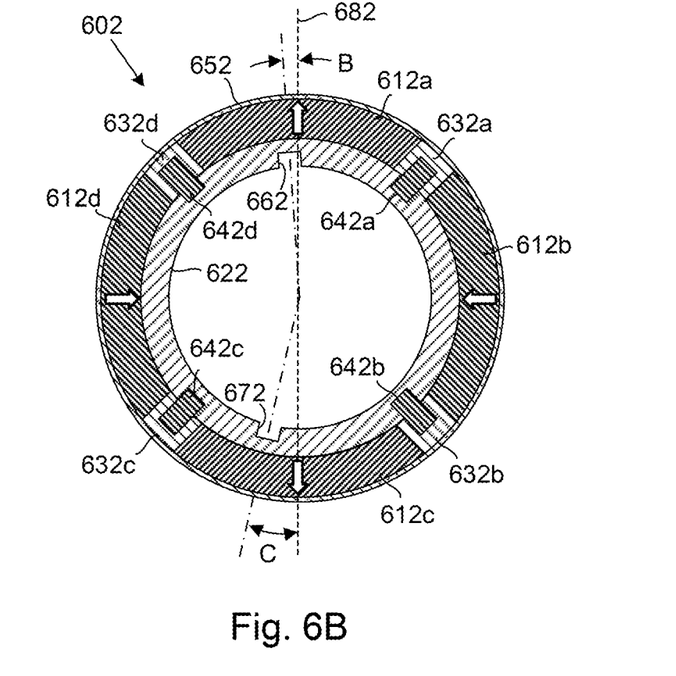

Referring to FIGS. 6A and 6B, a pair of diagrams illustrating embodiments of the present invention are shown. In each of these embodiments, two angularly displaced keyways are provided in a carrier of the rotor section to enable positioning the rotor section in more than two circumferential orientations. FIG. 6A shows a first embodiment in which one of the keyways is aligned with one of the magnetic poles of the rotor section. FIG. 6B shows a second embodiment in which neither of the keyways is aligned with a pole of the rotor section. In FIGS. 6A and 6B, both embodiments are depicted in the same circumferential orientation (i.e., the poles of the rotor section have the same orientation, as indicated by the white arrows in permanent magnets 610).

Referring to FIG. 6A, the structure of the rotor section is substantially the same as the rotor section depicted in FIGS. 3A and 3B. Rotor section 600 includes four magnets 610a-610d which are mounted on a tubular carrier 620. Spacers 630a-630d are positioned between magnets 610a-610d to maintain the circumferential spacing of the magnets. Pins 640a-640d hold spacers 630a-630d in position so that the spacers and permanent magnets 610a-610d do not move circumferentially with respect to carrier 620. Outer sleeve 650 is positioned radially outward from the magnets and spacers to help retain the magnets on the carrier.

Rotor section 600 differs from rotor section 300 in that rotor section 600 has two keyways 660 and 670 which are formed in carrier 620 (e.g., machined into the carrier, or formed in laminations that are stacked together to construct the carrier). Keyway 660 is aligned with a plane of symmetry 680 of the rotor section. (Plane of symmetry 680 extends into and out of the page from the dashed line shown in the figure.) If the rotor section is flipped around the plane of symmetry (i.e., the first and second ends of the rotor are reversed), the structure of the rotor is effectively the same, except for the positioning of keyway 670. In this embodiment, plane of symmetry 680 is aligned with one of the poles of the rotor section. The poles of the rotor are therefore unchanged when the rotor section is flipped.

Figure 7A:
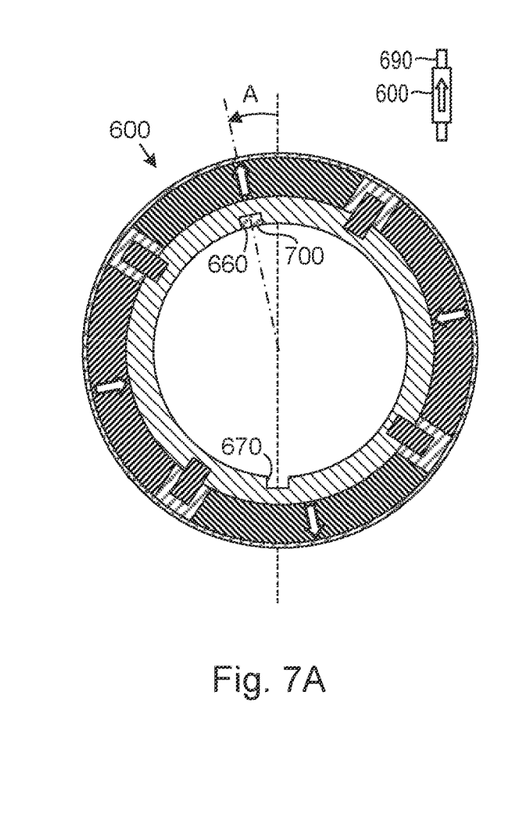
FIGS. 7A-7C are diagrams illustrating the positioning of the rotor section of FIG. 6A.
Figure 7B:
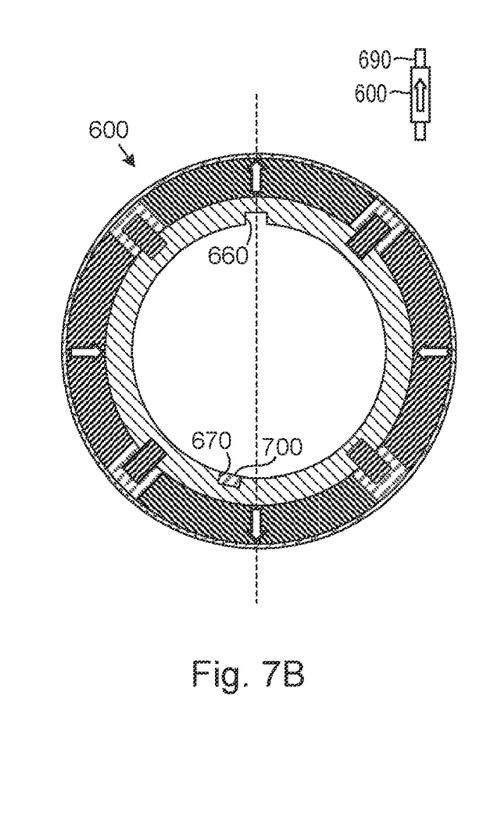
Figure 7C:
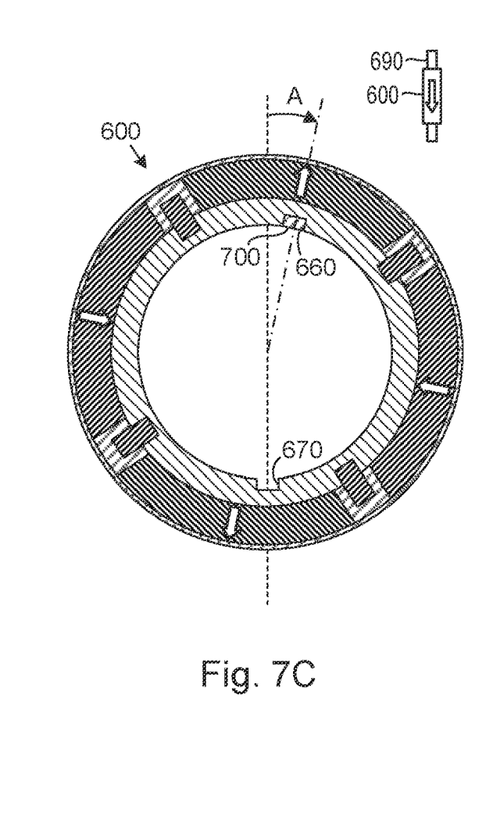

Keyway 670 has an angular displacement A from the plane of symmetry. These two keyways allow the rotor section to be positioned with any one of three orientations: advanced; neutral; and delayed. These three positions are illustrated in FIGS. 7A-7C. It should be noted that these three different orientations can be achieved using only two fixed keyways which are identical for each rotor section. Because the machining of the keyways is a relatively simple and straightforward process (conventional rotor sections typically have a keyway machined in the carrier), this adds relatively little cost or complexity to the rotor section. Further, because each of the rotor sections is identical there are no manufacturing complexities arising from a need to have different manufacturing processes (e.g., machining the keyways in different places, or having to manually adjust a clocking/orientation mechanism) for different rotor sections.

FIG. 7A shows rotor section 600 installed with keyway 670 keyed to the motor shaft. FIG. 7B shows rotor section 600 installed with keyway 660 keyed to the motor shaft. FIG. 7C shows rotor section 600 installed with keyway 670 keyed to the motor shaft, but the rotor section has been flipped end-to-end. In other words, if the first end of the rotor section is facing out of the page in FIGS. 7A and 7B, the first end is facing the opposite direction—into the page—in FIG. 7C. The orientation of rotor section 600 on the motor shaft 690 is shown at the top of each figure (the arrow indicating the first end).

For the purposes of this disclosure, the orientation of the rotor section in FIG. 7A may be referred to as a first axial orientation, while the orientation of the rotor section in FIG. 7C may be referred to as a second axial orientation (which is opposite the first axial orientation). The rotor section in FIG. 7B has the first axial orientation. Similarly, in the example of FIGS. 10A-10D (described in more detail below), the rotor sections of FIGS. 10A and 10C have the first axial orientation, while the rotor sections of FIGS. 10B and 10D have the second axial orientation.

The neutral orientation of rotor section 600 is depicted in FIG. 7B. In this orientation, the motor shaft is keyed to keyway 660 (as represented by the alignment of this keyway with the dotted line). Thus, the key of the motor shaft (not shown in the figure) is aligned with the plane of symmetry and the corresponding pole of the rotor section. (The pole of the rotor section which is aligned with the plane of symmetry will simply be referred to as "the pole" of the rotor section). As shown in FIG. 7A, rotor section 600 may alternatively be installed with the motor shaft keyed to keyway 670. In this case, the pole of the rotor section will be advanced by angle A with respect to the motor shaft. A third orientation of rotor section 600 can be achieved by flipping the rotor section end-to-end and installing the rotor section with the motor shaft keyed to keyway 670. This results in the rotor section being delayed by angle A.

In each of these orientations, a key of the motor shaft will be positioned in one of the keyways to position the rotor section and to prevent the rotor section from rotating with respect to the motor shaft. The key may be integral to (or installed in) the shaft, or the shaft may have a keyway so that a separate key can be inserted in the keyways of the shaft and rotor section to prevent them from rotating relative to each other. References herein to a key of the shaft should be construed to include both of these configurations. Additionally, the key of the motor shaft may comprise a single key that extends along the shaft for a length that is sufficient to engage multiple rotor sections, or the key may be discontinuous or comprise multiple keys or key segments that separately engage different rotor sections. In embodiments using multiple keys or key segments, the multiple keys or key segments are aligned circumferentially. It may be desirable to position an insert 700 in the unused keyway for the purpose of maintaining the balance of the rotor section. Otherwise, the removal of mass from at the location of the additional keyway may cause the motor to vibrate as it operates.

It should be noted that angle A may be determined in various ways. For example, in one embodiment, the angle is determined empirically by measuring or computing the twist of the rotor in operation and computing an angle A that minimizes total torque losses when each of the rotor sections is oriented in one of the three positions (advanced, neutral, delayed) with respect to the twist of the shaft.

With the ability to install the rotor sections in three different orientations (advanced, neutral, delayed), a significant amount of the misalignment caused by the twisting of the motor shaft can be corrected. While the three available orientations do not allow for each rotor section to be perfectly aligned (i.e., to have each rotor section perfectly synchronized with the rotating magnetic fields of the stator during operation, the misalignment of each rotor section can be reduced to a level at which torque losses are very minor, since the loss of torque is a cosine function of the misalignment rather than a linear function. This is shown in FIGS. 8A and 8B.

Figure 8A:
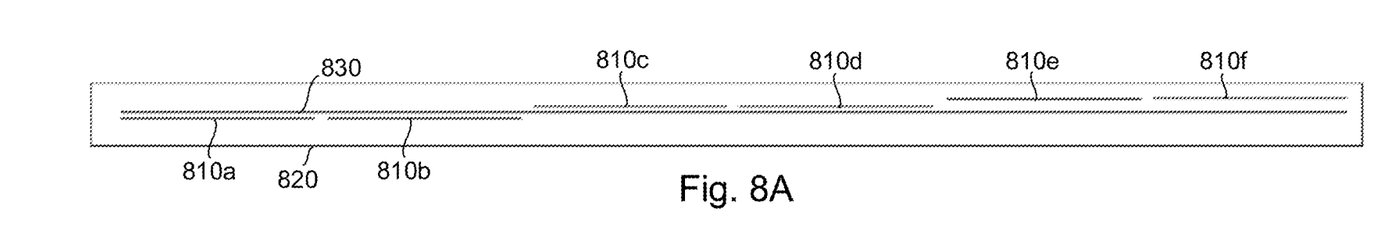
FIGS. 8A and 8B are diagrammatic representations of the positioning of a series of rotor sections mounted on a motor shaft when the motor is at rest and in operation in accordance with one embodiment.
Figure 8B:
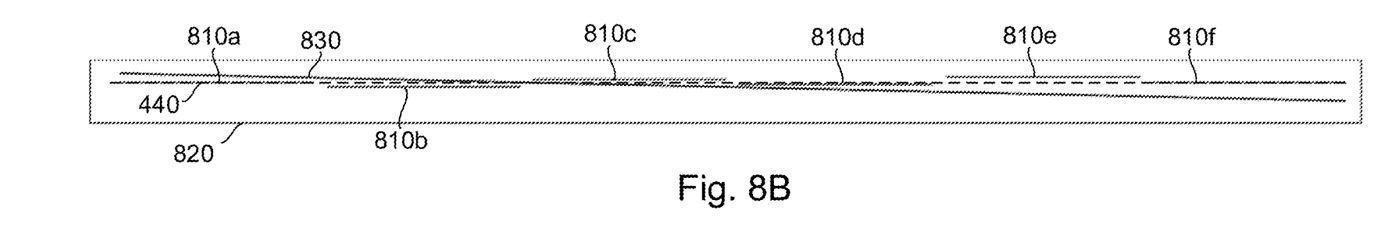

FIGS. 8A and 8B are a pair of diagrams illustrating the effect of using rotor sections as described in the above embodiment. These figures, similar to those of FIGS. 4A and 4B, represent the positioning of a series of rotor sections. In this case, rotor sections 810a-810f are identically manufactured according to the embodiment of FIG. 6A, but are installed using the different keyways to achieve advanced, neutral, or delayed orientation of the different rotor sections. Referring to FIG. 8A, a motor shaft 820 and rotor sections 810a-810f are represented in a non-operating state. In this state, motor shaft 820 is not twisted, so the key of the shaft as indicated by line 830 extends horizontally in the figure. Two of the rotor sections (810a-810b) are positioned just below line 830. These rotor sections are installed in the advanced position (see FIG. 7A). Two of the rotor sections (810c-810d) are installed in a neutral position (see FIG. 7B) and are positioned just above line 830. Two of the rotor sections (810e-810f) are installed in the delayed position (see FIG. 7C) and are positioned slightly higher above line 830.

It should be noted that while only six rotor sections are depicted in this figure, there may be many more rotor sections in a given embodiment. Further, because the twist of the shaft is not linear, there may be a different number of rotor sections that use each of the possible orientations. In other words, a first subset of the rotor sections may be installed in a first circumferential orientation, while a second subset of the rotor sections is installed in a second circumferential orientation and a third subset of the rotor sections is installed in a second circumferential orientation. Each subset will normally be a contiguous series of rotor sections.

Typically, since the twist of the motor shaft is greatest at the upper end of the motor, there will be fewer rotor sections that have the same orientation at this end of the motor. Because the twist of the motor shaft is least at the lower end, there will be more rotor sections with the same orientation at the lower end of the motor. For instance, in one embodiment there may be a subset of five rotor sections installed in the advanced orientation, a subset of seven rotor sections installed in the neutral orientation, and a subset of eight rotor sections installed in the delayed orientation.

Referring to FIG. 8B, when the motor is operated, each of the rotor sections applies a corresponding torque to the motor shaft, causing the shaft to twist, as indicated by sloped line 830. As a result of the twisting, each of rotor sections 810b-810f shifts downward in the figure. Because there are only three possible circumferential orientations of the rotor sections, it is not possible for all of the rotor sections to become perfectly aligned when the motor shaft twists. The rotor sections do, however, move to positions that are close to alignment (which is indicated by the dashed line). It can be seen in the figure that each successive rotor section is alternately slightly above or slightly below the dashed line. Because the torque loss is a cosine function, these small misalignments do not cause significant torque loss for any of the rotor sections.

Figure 9:
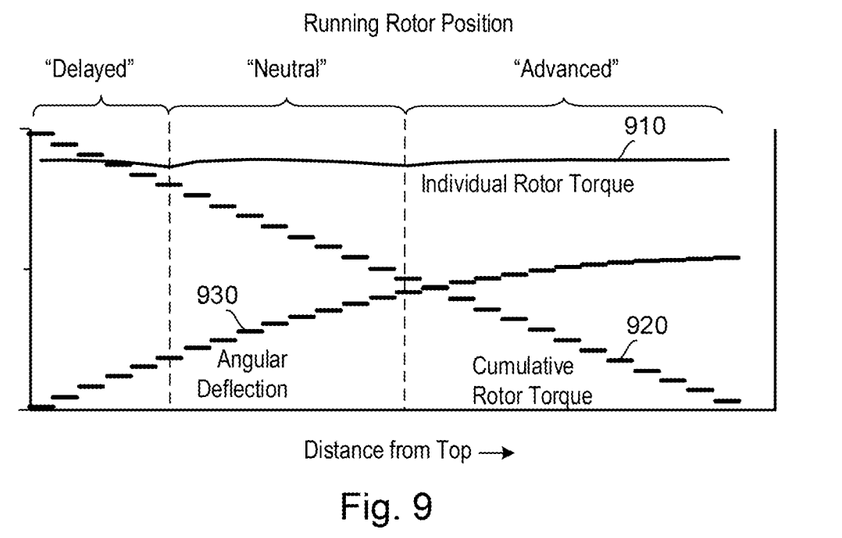
FIG. 9 is a diagrammatic illustration of the performance of an ESP motor during operation in accordance with one embodiment.

Referring to FIG. 9, a diagram illustrating the performance of an ESP motor that implements this embodiment is shown. FIG. 9 it is a chart showing the individual torque of the rotor sections (910), the total torque (920) and the shaft/rotor section deflection (930) as functions of the distance from the top of the motor. As in the case of FIG. 5, the chart of FIG. 9 is scale-less and roughly normalized to allow comparison of the curves.

In FIG. 9, the deflection curve 930 is very similar to that shown in FIG. 5. Because the rotor sections have been installed in advanced, neutral and delayed circumferential orientations, the curve depicting the individual rotor section torques does not drop off at the upper end of the motor (the left end of the curve), but instead stays near the curve's maximum. In the example of FIG. 5, the uppermost rotor section develops roughly 25% less than the maximum torque, while in FIG. 9, the uppermost rotor section develops approximately the maximum torque, with all of the rotor sections producing within about 5% of the maximum torque. Since the torque produced by the rotor sections at the upper end of the motor is increased, the total torque of the motor is increased. Curve 920 shows the increased total torque in comparison to curve 520 of FIG. 5.

Referring to FIG. 6B, the structure of a rotor section in accordance with an alternative embodiment is shown. The general structure of rotor section 602 in FIG. 6B is very similar to that of the embodiment depicted in FIG. 6A. Rotor 602 has four permanent magnets 612a-612d that are mounted on a carrier 622. Spacers 632a-632d are positioned between the magnets to maintain the circumferential spacing of the magnets on the carrier. Pins 642a-642d hold the spacers in position on the carrier so that the spacers and the permanent magnets do not move circumferentially with respect to the carrier. Outer sleeve 652 serves to retain the magnets on the carrier.

The difference between rotor 600 of FIG. 6A and rotor 602 of FIG. 6B is that the two keyways formed in the inner surface of carrier 622 are positioned differently than the keyways of carrier 620. Specifically, neither keyway 662 nor keyway 672 is aligned with the plane of symmetry 682 (a pole of the rotor), as compared to rotor 600, in which keyway 660 is aligned with the plane of symmetry 680 at the pole of the rotor). As shown in the figure, keyway 662 is offset from the pole by an angle B, while keyway 672 is offset from the pole by an angle C. In one embodiment, angle C is three times angle B. this arrangement allows the rotor to be installed in four different circumferential orientations.

Figure 10A:
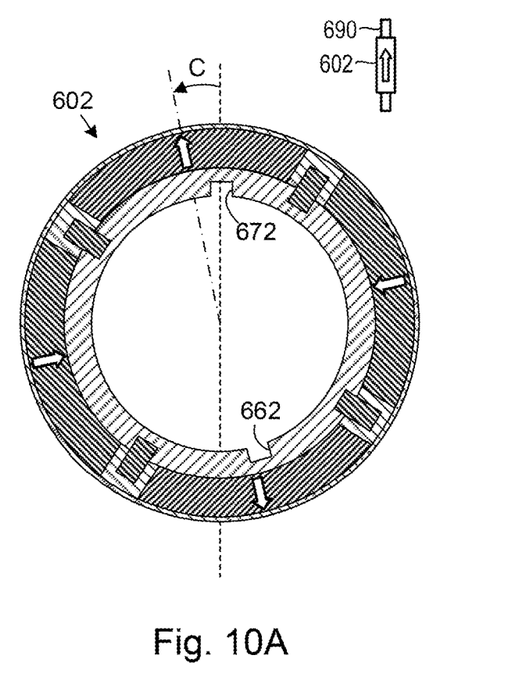
FIGS. 10A-10D are diagrams illustrating the positioning of the rotor section of FIG. 6B.
Figure 10B:
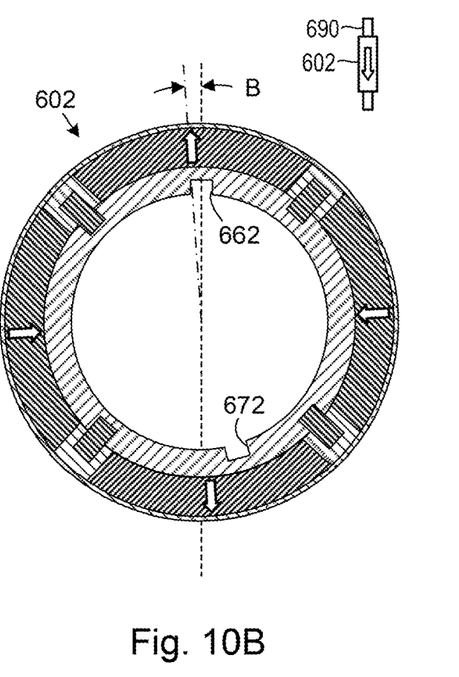
Figure 10C:
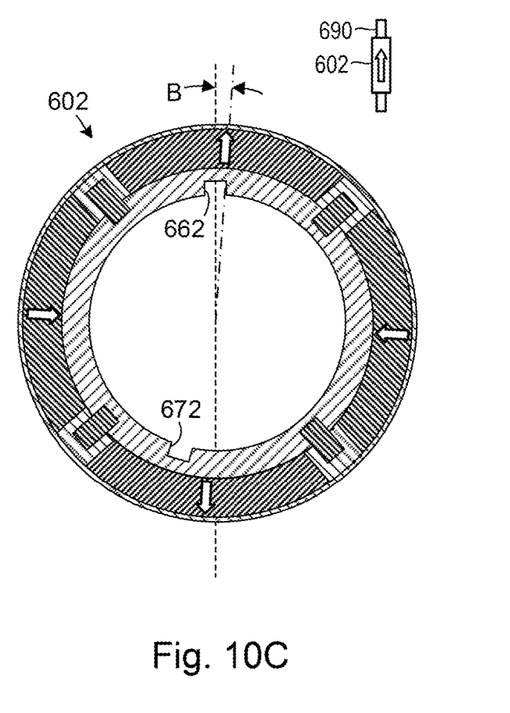
Figure 10D:
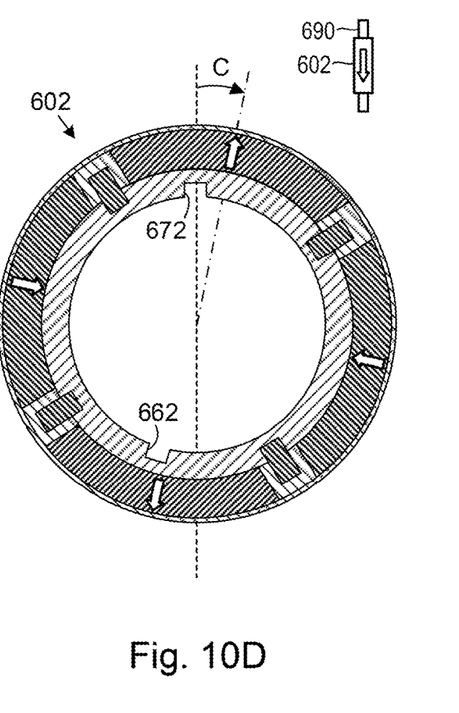

The circumferential orientations that are possible with the embodiment of FIG. 6B are illustrated in FIGS. 10A-10D. These orientations include two advanced orientations, and two delayed orientations. FIG. 10A shows the rotor advanced by angle C, FIG. 10B shows the rotor advanced by angle B, FIG. 10C shows the rotor delayed by angle B, and FIG. 10D shows the rotor delayed by angle C. Similar to the previously described embodiment, two of these orientations are achieved with rotor 602 installed in one direction (indicated by the upward arrow in the depiction of rotor 602 on shaft 692), while the other two orientations are achieved with rotor 602 flipped end-to-end with respect to the shaft (indicated by the downward arrow in the depiction of rotor 602 on shaft 692).

It can be seen from FIGS. 10A-10D that, by selecting angle C to be three times angle B, the four successive positions of the rotor (going from FIG. 10A to FIG. 10D) are incremented by an angle of 2B. (by comparison, the three successive positions of rotor 602 are incremented by an angle of A.) The keyways may, however, be placed at different positions (e.g., at different offsets from the poles of the rotor).

It should be noted that the embodiments explicitly described herein are exemplary, and many alternative embodiments may be possible. In particular, there may be many variations of the structure of the rotor in alternative embodiments. For instance, while the above described embodiments use surface-mounted magnets, other embodiments may use magnets that are installed in cavities within a rotor core. Similarly, although the foregoing embodiments include a tubular carrier on which the permanent magnets are mounted, other embodiments may be constructed using carriers or rotor cores that are formed by stacking a set of laminations that are secured together. The rotor sections may also have a different number of poles. Numerous other variations are also possible. Additional keyways could also be provided if more circumferential orientations are desired (although it is contemplated that three or four positions as described above should be sufficient in most cases to achieve near-optimal performance.

As noted above, embodiments of the present invention may provide a number of advantages over existing technologies. One advantage is the simplicity of the design. Only two keyways need to be provided to couple the rotor sections to the motor shaft, and these keyways are fixed, so it is not necessary to implement a complex, or even multi-part, mechanism for adjusting a keyway of the rotor section. This simplified design reduces cost and increases manufacturability of the rotor sections. The simple design of the present embodiments also simplifies installation and reduces training requirements associated with the proper orientation of the rotor sections during installation. Additionally, because each of the rotor sections is identical, it is not necessary to manufacture or install rotor sections that have multiple, different designs (e.g., keyways located at different positions in the different rotor section designs), again leading to greater manufacturability than existing technologies. As a result of these and other benefits associated with the present embodiments, it may be practical to implement rotor section offsets, where cost and complexity of existing technologies may have made this impractical.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed herein.

What is claimed is:

1. A motor comprising:
a stator having a bore therethrough;
a plurality of rotor sections rotatably positioned coaxially within the bore of the stator; and
a shaft, wherein each of the rotor sections is secured to the shaft;
wherein each rotor section of the plurality of rotor sections includes one or more permanent magnets and has corresponding magnetic poles;
wherein each rotor section has first and second inwardly facing keyways;
wherein when each rotor section is positioned in a first axial orientation and a first circumferential orientation, the first and second inwardly facing keyways are identically positioned in each rotor section;
wherein the first and second inwardly facing keyways are configured to enable each rotor section to be positioned in one of at least three distinct circumferential orientations with respect to a key of the shaft wherein the key of the shaft comprises one or more key segments and wherein each of the key segments is circumferentially aligned at a first circumferential position; and
wherein for each rotor section, the key of the shaft is engaged with one of the first and second inwardly facing keyways of the rotor section, thereby securing the rotor section in a corresponding one of the at least three distinct circumferential orientations.

2. The motor of claim 1, wherein the plurality of rotor sections includes a first subset of rotor sections that is secured to the shaft in a first one of the circumferential orientations, a second subset of rotor sections that is secured to the shaft in a second one of the circumferential orientations, and a third subset of rotor sections that is secured to the shaft in a third one of the circumferential orientations.

3. The motor of claim 1, wherein each rotor section in the plurality of rotor sections is identical.

4. The motor of claim 3, wherein when each rotor section is positioned in a second axial orientation which is opposite the first axial orientation, and in the first circumferential orientation, at least one of the first and second inwardly facing keyways has a second position which is different than a first position of the at least one of the first and second inwardly facing keyways in the first axial orientation.

5. The motor of claim 1, wherein in each of the rotor sections, the first inwardly facing keyway is aligned with a plane of symmetry of the rotor section and the second inwardly facing keyway is angularly offset from the first pole of the rotor section, and wherein the rotor section is thereby capable of being positioned in one of three distinct circumferential orientations with respect to the key of the shaft.

6. The motor of claim 5, wherein the plane of symmetry is aligned with a first pole of the rotor section.

7. The motor of claim 1, wherein in each of the rotor sections, both the first and second inwardly facing keyways are angularly offset from a plane of symmetry of the rotor section, and wherein the rotor section is thereby capable of being positioned in one of four distinct circumferential orientations with respect to the key of the shaft.

8. The motor of claim 7, wherein the first inwardly facing keyway is angularly offset from the plane of symmetry of the rotor section by a first angle and the second inwardly facing keyway is angularly offset from the first pole of the rotor section by a second angle which is three times the first angle.

9. The motor of claim 1, wherein each of the first, second and third subsets of rotor sections includes a different number of the rotor sections.

10. The motor of claim 1, wherein for each rotor section, a keyway insert is inserted in one of the first and second inwardly facing keyways of the rotor section that is not engaged with the key of the shaft.

11. The motor of claim 1, wherein each of the one or more key segments, wherein each of the key segments separately engage different rotor sections.

12. An electric submersible pump (ESP) system comprising:
a submersible pump; and
a motor coupled to drive the submersible pump, wherein the motor includes a stator having a bore therethrough, a plurality of rotor sections rotatably positioned coaxially within the bore of the stator, and a shaft, wherein each of the rotor sections is secured to the shaft;
wherein each rotor section of the plurality of rotor sections includes one or more permanent magnets and has corresponding magnetic poles;
wherein each rotor section has first and second inwardly facing keyways, wherein the first and second inwardly facing keyways are identically positioned in each rotor section, wherein the first and second inwardly facing keyways are configured to enable each rotor section be positioned in one of at least three distinct circumferential orientations with respect to a key of the shaft wherein the key of the shaft comprises one or more key segments and wherein each of the key segments is circumferentially aligned at a first circumferential position; and wherein the plurality of rotor sections includes a first subset of rotor sections that is secured to the shaft in a first one of the circumferential orientations, a second subset of rotor sections that is secured to the shaft in a second one of the circumferential orientations, and a third subset of rotor sections that is secured to the shaft in a third one of the circumferential orientations.

13. A method comprising:

providing a motor shaft having a key comprising one or more key segments, wherein each of the key segments is circumferentially aligned at a first circumferential position;

providing a plurality of rotor sections, wherein each rotor section of the plurality of rotor sections includes one or more permanent magnets and has corresponding magnetic poles, and wherein each rotor section has first and second inwardly facing keyways, wherein the first and second inwardly facing keyways are identically positioned in each rotor section, wherein the first and second inwardly facing keyways are configured to enable each rotor section be positioned in one of at least three distinct circumferential orientations with respect to the key of the shaft;

installing a first subset of the plurality of rotor sections in a first one of the circumferential orientations;

installing a second subset of the plurality of rotor sections in a second one of the circumferential orientations; and installing a third subset of the plurality of rotor sections in a third one of the circumferential orientations.

14. The method of claim 13, wherein the plurality of rotor sections comprise identical rotor sections, wherein installing the first subset of the plurality of rotor sections comprises installing each of the rotor sections in the first plurality of rotor sections in a first axial orientation and wherein installing the second subset of the plurality of rotor sections comprises installing each of the rotor sections in the second plurality of rotor sections in a second axial orientation which is opposite the first axial orientation.

15. The method of claim 14, wherein in each of the rotor sections, the first inwardly facing keyway is aligned with a plane of symmetry at a first pole of the rotor section, and the second inwardly facing keyway is angularly offset from the plane of symmetry of the rotor section, and wherein:

installing the first subset of the plurality of rotor sections comprises engaging the second inwardly facing keyway of each rotor section with corresponding ones of the key segments of the shaft;

installing the second subset of the plurality of rotor sections comprises engaging the first inwardly facing keyway of each rotor section with corresponding ones of the key segments of the shaft; and installing the third subset of the plurality of rotor sections comprises installing each rotor section in the second axial orientation and engaging the second inwardly facing keyway of each rotor section with corresponding ones of the key segments of the shaft.

16. The method of claim 13, wherein the plurality of rotor sections comprise identical rotor sections, further comprising installing a fourth subset of the plurality of rotor sections in a fourth one of the circumferential orientations;

wherein in each of the rotor sections, both the first and second inwardly facing keyways are angularly offset from a plane of symmetry of the rotor section, and wherein the rotor section is thereby capable of being positioned in one of four distinct circumferential orientations with respect to the key segments of the shaft;

wherein installing the first subset of the plurality of rotor sections comprises installing each of the rotor sections in the first plurality of rotor sections in a first axial orientation and engaging the second inwardly facing keyway of each rotor section with corresponding ones of the key segments of the shaft;

wherein installing the second subset of the plurality of rotor sections comprises installing each of the rotor sections in the second plurality of rotor sections in the first axial orientation and engaging the first inwardly facing keyway of each rotor section with corresponding ones of the key segments of the shaft;

wherein installing the third subset of the plurality of rotor sections comprises installing each of the rotor sections in the third plurality of rotor sections in a second axial orientation which is opposite the first axial orientation and engaging the first inwardly facing keyway of each rotor section with corresponding ones of the key segments of the shaft; and wherein installing the fourth subset of the plurality of rotor sections comprises installing each of the rotor sections in the fourth plurality of rotor sections in the second axial orientation and engaging the second inwardly facing keyway of each rotor section with corresponding ones of the key segments of the shaft.

17. The motor of claim 1, wherein when the plurality of rotor sections are installed on the shaft, at least one rotor section of the plurality of rotor sections is positioned at each of the at least three distinct circumferential orientations with respect to the key of the shaft.

18. The method of claim 13, wherein the one or more key of the shaft are circumferentially aligned at a first circumferential position.

* * * * *